United States Patent
Gupta

(10) Patent No.: US 10,360,397 B2
(45) Date of Patent: Jul. 23, 2019

(54) SECURE RETRIEVAL OF CLOUD-BASED SENSITIVE DATA BY OBFUSCATING DATA ACCESS PATTERNS

(71) Applicant: SAP SE, Walldorf (DE)

(72) Inventor: Vipul Gupta, Bangalore (IN)

(73) Assignee: SAP SE, Walldorf (DE)

( * ) Notice: Subject to any disclaimer, the term of this patent is extended or adjusted under 35 U.S.C. 154(b) by 173 days.

(21) Appl. No.: 15/439,368

(22) Filed: Feb. 22, 2017

(65) Prior Publication Data

US 2018/0239920 A1 Aug. 23, 2018

(51) Int. Cl.
G06F 21/00 (2013.01)
G06F 21/62 (2013.01)
H04L 9/08 (2006.01)

(52) U.S. Cl.
CPC ...... G06F 21/6218 (2013.01); G06F 21/6272 (2013.01); H04L 9/0894 (2013.01)

(58) Field of Classification Search
CPC . G06F 21/6218; G06F 21/6272; H04L 9/0643
See application file for complete search history.

(56) References Cited

U.S. PATENT DOCUMENTS

2006/0136390 A1* 6/2006 Zhao ................. G06F 17/30949
2009/0187771 A1* 7/2009 McLellan, Jr. ....... H04L 9/0891
713/193
2010/0287171 A1* 11/2010 Schneider ......... G06F 17/30864
707/759
2013/0290734 A1* 10/2013 Branton ................ H04L 9/0863
713/189
2014/0189364 A1* 7/2014 Kolesnikov ......... G06F 21/6218
713/189
2016/0267135 A1* 9/2016 Idicula .............. G06F 17/30466

* cited by examiner

*Primary Examiner* — Jason K Gee
*Assistant Examiner* — Ka Shan Choy
(74) *Attorney, Agent, or Firm* — Jones Day

(57) ABSTRACT

Cloud-based data is securely retrieved by obfuscating access patterns. A cloud storage system receives a request for data from a remote client that specifies a key. Thereafter, the cloud storage system iterates through an index to identify all locations corresponding to the specified key. Such index is generated by applying a series of j hash functions to each key resulting in a j different tables forming part of the index. Using the index, the cloud storage system returns data from the identified locations to the client. As each write operation works by using non-deterministic encryption, the write operation changes the records stored in this data structure, and when the record is not changed, the algorithm simply rewrites the data which is stored in the data structure by rewriting the same value back again. However since, a nondeterministic encryption is utilized, it makes it indistinguishable as to when new data was written and when existing data is rewritten.

17 Claims, 4 Drawing Sheets

| | Count | Sum of Key | Sum of Value | Sum (hash of Key) | Sum (hash of value) | Actual Data Values mapped to this index |
|---|---|---|---|---|---|---|
| 1 | | | | | | |
| 2 | | | | | | |
| 3 | | | | | | |
| 4 | | | | | | |
| ... | | | | | | |
| m | Count | Sum of Key | Sum of Value | Sum (Hash of Key) | Sum (Hash of Value) | Actual Data Values mapped to this index |

FIG. 2

SECURE RETRIEVAL OF CLOUD-BASED SENSITIVE DATA BY OBFUSCATING DATA ACCESS PATTERNS

TECHNICAL FIELD

The subject matter described herein relates to the obfuscating retrieval access patterns of sensitive data accessible via cloud-based services.

BACKGROUND

Cryptography techniques work by encrypting data using a secret key before storing them. With the massive increase in the generation of data (also known as big data) in the last few years, coupled with the advent of smaller computers (with less memory), commonly referred under the umbrella of Internet-of-Things (IoT) devices, the process of storing and accessing sensitive business data from third party cloud vendors (also other cloud vendors used only for storing personal data) has become common. The amount of sensitive data stored in the cloud has increased many fold and the security and privacy of this data has arisen as the point of utmost priority and importance with both the customers storing their data on the cloud, and the cloud vendor taking the responsibility of storing the customer's data.

Even though customer's data is stored securely, the access or filtering of the data based on a request reveals the content of the data. One solution is to transfer the entire set of requested data to the client in encrypted form and allow the client to use the decryption key and access the data. However, devices accessing cloud-based data are becoming smaller and smaller, and with less memory, and there are many situations where the requested data cannot be transferred to the client's computer/device for further processing. In addition, complex data processing is generally preferred on more powerful computer systems, rather than the small computers (e.g., mobile phones, etc.) to access or visualize the results. In such a scenario the data needs to be processed in the cloud, however, access of such data in the cloud reveals patterns through which the cloud provider or a hacker on the cloud can understand, and opens an opportunity for misuse of the contents of the data so revealed.

SUMMARY

Cloud-based data is securely retrieved by obfuscating access patterns. A cloud storage system receives a request for data from a remote client that specifies a key. Thereafter, the cloud storage system iterates through an index to identify all locations corresponding to the specified key. Such index is generated by applying a series of j hash functions to each key resulting in a j different tables forming part of the index. Using the index, the cloud storage system returns data from the identified locations to the client.

In aspect, cloud-based data can be retrieved by obfuscating access patterns in which, a request for data that specifies a key is received by a cloud storage system from a remote client, a request for data. The cloud storage system then iterates an index to identify all data value locations corresponding to the specified key. The index is generated by applying a series of j hash functions to each key resulting in a j different tables forming part of the index. Thereafter, the cloud storage system returns data from the identified locations to the client.

Any memory locations implicated by the request can be decrypted and re-encrypted using at least one non-deterministic encryption algorithm.

Each location within the index can include a variety of fields including a field to store a count of keys mapping to such location, an encrypted sum field specifying a sum of the keys, an encrypted field having a sum of values corresponding to the keys, an encrypted sum field containing a sum of the corresponding hash of the key, and/or an encrypted field having a sum of the value.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for more rapid cloud-based data lookups, existence queries, listing of elements, deletion of entries, and related questions without revealing the access patterns of customers. These advantages, in turn, also ensure that information about cloud-based data is not available to hackers or otherwise misappropriated.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is a diagram illustrating a table to which hash functions can be mapped;

DETAILED DESCRIPTION

Figure 1:
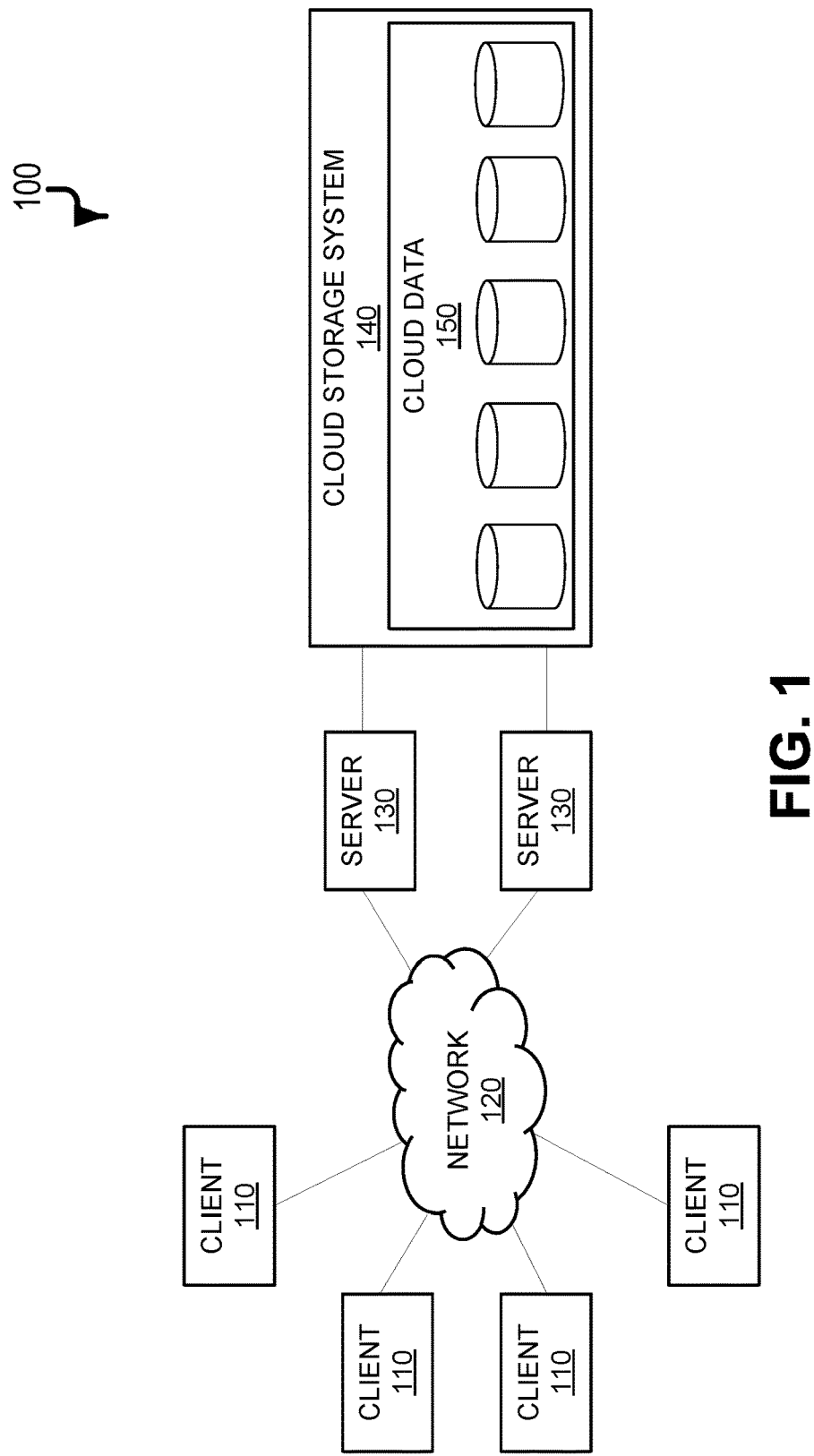
FIG. 1 is a diagram illustrating a computing environment for implementing aspects of the current subject matter.

FIG. 1 is a system diagram 100 illustrating an arrangement in which a plurality of computer clients 110 (e.g. servers, personal computers, mobile phones, tablet computers, etc.) access a cloud storage system 140 that stores cloud data 150 for each of a plurality of different tenants (which have segregated and separate and distinct database tables for their corresponding data). The clients 110 can access the cloud data 150 by way of one or more services that provide access to the cloud storage system 140 by way of a computer network 120 (which may allow wired and/or wireless communications) and one or more intervening web servers 130. Such cloud services allow the clients 110 to request data forming part of the cloud data 150. It will be appreciated that each client 110, web server 130, and the cloud storage system 140 may each comprise one or more programmable processors which distributed across one or more computing devices. For example, the cloud storage system 140 can comprise a data center or data centers storing the cloud data 150 across hundreds or thousands of databases (which may or not be at a same physical site).

The cloud storage system 140 can store the cloud data 150 using a non-deterministic encryption algorithm to maintain the privacy of the data. The subject matter herein uses such a non-deterministic encryption algorithm as one of the building blocks to obfuscate the access patterns of the cloud data 150 by the clients 110 and/or by any intervening web servers 130.

The cloud data 150 can be arranged such that the amount of data stored on the cloud for a tenant is N rows. Data requested by such tenant for processing is M rows so that M is less than or equal to N~M<=N.

The cloud storage system 140 can allocate storage capacity of X rows per tenant. X is strictly less than M (i.e., ~X<M). The capacity of the index is I~I<=N. I<=N; This condition has a lot of implications on the data structure's capacity and probability of correct answer for all supported operations. However with careful tuning this probability can be made very close to 1.

Various types of encryption algorithms can be used by the cloud storage system 140, for example, AES 256.

The entire data stored on the cloud storage system 140 for the tenant can be encrypted. The cloud storage system 140 can be configured to comply with various security requirements that necessitate that data of the tenants forming part of the cloud data 150 is not available or otherwise exposed to the provider of the cloud storage system 140.

With reference to diagram 200 of FIG. 2, a set of hash functions can be utilized by the cloud storage system 140 that convert the data key to indexes into a table (both can utilize fully random hash functions).

The hash functions can be in a defined order.

For each key k forming part of the index I, j hash functions can be selected in order such that there are j unique values.

New hash functions can be generated on the fly by the following algorithm. Where i ranges from 1 to say j.

$$Hash(1) + iHash(2)$$

$$Hash(1) + 2Hash(2)$$

$$...$$

$$Hash(1) + iHash(j)$$

$$Hash(2) + iHash(3)$$

$$...$$

And so on

Each hash function can map to a separate table and point to a specific index in the corresponding table. As there are j hash values, there will be j tables for the mappings as well. The data structure of the table of FIG. 2 can be augmented to store many more things rather than just the entry for mapping the result of hash. At each location one can store the count of keys mapping to it. At each location, a sum field can be stored containing the sum (S) of the key value which can, in turn, be stored in an encrypted format. Each location can also have a sum for the values (V) corresponding to the keys which can also be in an encrypted format. The count equal to one can act as an optimization and does not require any iteration over the sub-structure. Each location can also have a sub-structure to store individual key-values which can be encrypted.

At each location, a hash of the key can also be computed and a sum field containing the sum (HS) of the hash of the key can be stored (optionally in an encrypted format). At each location, a hash of the value can be computed and a sum field containing the sum (HV) of the hash of the value can be stored (optionally in an encrypted format).

Initially the structure starts off as empty. When (key, value) pairs are added, the hash functions are applied and corresponding entries in each table can be updated. The key is added to all these tables and segmented structures are updated. When a tenant makes a request for an entry or set of entries (via a client 110), the cloud computing system 140 iterates over locations mapped to its key, but always make a write operation whether the entry maps to the request or not. In order to do this, the data and/or any memory locations implicated by the request is decrypted and re-encrypted. As the current subject matter is using non-deterministic encryption, the stored data gets changed. For look ups the data is not modified, hence the S and V columns are not modified, however the actual values being encrypted are restored in the field though with a different encrypted value. As numerous memory locations are accessed, the hacker or the cloud is not able to track which locations match the requesting query and which does not, and hence the customer's access patterns are not revealed. In other words, this ensures that the access of memory locations whether relevant or not is not revealed to any attacker in the system.

It will be appreciated that memory locations are implicated by the insertion of a key as well as checking for presence of keys. These accesses reveal what the customer is accessing. Now assume that a memory location is accessed that is not relevant, still checking whether the location is relevant or not will be decided by checking the data at that memory location. To check such data, the data is decrypted which requires an initialization vector, but the algorithm always rewrites the value with a different initialization vector. The attacker will never realize this; as even if the value is unchanged (say in case of no match, or no update) a new initialization vector can be created to rewrite the same contents back into the location but with a different encrypted value (non deterministic encryption).

In other words, because each write operation works by using non deterministic encryption, the write operation changes the records stored in this data structure, and when the record is not changed, the algorithm simply rewrites the original data stored in the data structure by rewriting the same value back again. However, because a non deterministic encryption is used, it makes it indistinguishable as to when new data was written, and when existing data is rewritten.

An example data structure is provided below:

```
class Node {
    long count;
    var encrypted Sum of Key;
```

-continued

```
    var encrypted Sum of Value;
    var encrypted Sum(Hash of Key);
    var encrypted Sum(Hash of Value);
    List<Encrypted (key, value)> ; (LE)
}
```

Each location is an Array<Node>, which can be referred to as 'Element'. The size of each table is determined based on heuristics. It is assumed that hash functions are truly unique, and yield distinct locations. Having such random hash functions and separate tables allows for parallelsim and greatly speeds up the operations. As there is a need for J unique hash values for each (key, value), there is accordingly an array of this: Array<Element>-size J.

Count—Maintains the count of number of keys matching to this node location (depending on one of the random hash function chosen for the given key)

Encrypted Sum of Key—stored in encrypted format for security reasons. (Using non deterministic encryption).

if (count==1)—This is used to validate the existence of a key. This is an optimization scenario, where if the plaintext valued of the encrypted sum of key matches the requested key, then the value can be directly returned as the answer for a lookup.

if (count !=1)—There are many scenarios and use cases here—Assume an addition like (K, V), (K1, V1) followed by deletion of (K, V) followed by deletion of (K, V2). How does the system cope up with such a deletion? The value in the data structure will have cCount=0, but the sum of key will not be 0, hence easy to detect issues in the system and take corrective actions.

More uses of this field in combination of other fields explained below:

Encrypted Sum of Value—Stored in encrypted format for security reasons. (Using non deterministic encryption). This can be esed as CRC checks to ensure the consistency of data. This value can be used to map a number of elements to a sum for faster lookups.

Example: There are 4 value elements of a same key represented by a 4 bit array. As an example: 0001, 0010, 0100, 1000.

The 'SUM' sum operation for such a usage of this data structure can be is defined as 'binary AND' (&) and a lookup of value from here allows faster evaluation of the entire set of values mapped to the keyrange.

Encrypted Sum (Hash of Key)—Stored in encrypted format for security reasons (using non deterministic encryption). This serves as an extra important check to ensure consistency of the data structure.

On a lookup (i.e. the get operation)—

If count=0, and sum of key=0 and sum(hash of key) =0=>cell is guaranteed to be empty.

If count=1, sum of key matches the lookup key, sum(hash of key) matches the hash of the lookup key=>cell matches the required key, and the corresponding value can be returned.

If count=1, but the sum of key does not match the lookup key, even though the lookup key hashes to this cell and was inserted earlier, then there is a possibility of a sequence of events on the data structure where an additional key was added, and a key which was never added probably removed from the structure. This causes issues and leads to the sum of the key not matching the key. This happens even though the key was hashed and added to this location in the data structure.

Encrypted Sum (Hash of Value)—Stored in encrypted format for security reasons. (Using non deterministic encryption). Allows for the use of this data structure for situations where a single key can map to multiple values. Or in situations where a single key has been inserted multiple times with different values.

Also there could be a sequence of events where a key is added with value V and deleted with value V1. In such a situation, if another key hashes to that cell, and even though count=1, and sum of key matches the lookup key and the hash of the sum of keys matches the hash of the lookup key, but still the hash of the value will not match and allow capturing of errors.

Also there are situations where a key with multiple values could be added, repeatedly, see example in yellow above. In such a scenario, the duplicate addition of same key can be tracked by creating a similar sum operator function (as explained earlier) for hash of values, such that it allows to track the uniqueness of the key.

List<Encrypted (key, value)>—The actual values stored and maintained by this data structure. Stored in encrypted format for security reasons. This is uses primarily for entire listing and a backup for resetting the data structure. This should not be used primarily for lookup requests as that would lead to slow query performance.

Even though, there might be a number of error scenarios that can be captured with the above checks and additional fields, but this does not make the data structure unusable at run time as multiple paths are already created to access a value with multiple random hash functions. If one location is loss due to a discovered error as above, still the remaining hash locations would be sufficient to lookup the key and keep the data structure active, rather than doing an expensive rebuilding exercise of the entire data structure.

Bootstrap

All field are initialized to 0. Empty array with empty Elements are created

Generate J Hash keys (key)—As explained above

```
create a ordered set of generated hash keys with capacity J (lets name this
is OS)
do while number of hash keys generated are less than J
    execute next function in order (if required generate new function
    using listing 1)
    execute and generate a key
        add hash key to next position in OS and then continue
end do while
```

Put (key, value)—To add a (key, value) pair in the data structure

```
Generate J Hash values for the given key
for each hash value
    go to the corresponding Node element in the Array structure
    add 1 to count
    if (sum of key exists)
        decrypt existing Sum of key
    else
        0
    add the new key to current sum of key
    encrypt the new sum and store back
    if (sum of value exists)
        decrypt existing Sum of values
    else
        0
    add the new value to current sum of value
    encrypt the new sum and store back
```

```
    generate Hash(of Key) - HK
    generate Hash(of Value) - HV
if (sum of HK exists)
        decrypt existing Sum of HK
    else
        0
    add the new HK to current sum of HK
    encrypt the new sum(HK) and store back
    if (sum of HV exists)
        decrypt existing Sum of HV
    else
        0
    add the new HV to current sum of HV
    encrypt the new sum(HV) and store back
    encrypt the key value pair and add to list
end for
```

Remove (key, value)—To remove a (key, value) pair from the data structure.

```
Generate J Hash values for the given key
for each hash value
    If (! count >=1)
        return 'No op: key does not exist'
}
for each hash value
    delete 1 from count
    decrypt existing Sum of key
    subtract the key
    store the encrypted result back
    decrypt existing Sum of Values
    subtract the value
    store the encrypted result back
    decrypt existing hash Sum of key
    subtract the hash(key)
    store the encrypted result back
    decrypt existing hash Sum of Values
    subtract the hash(value)
    store the encrypted result back
    remove the key value pair from the list
end for
```

GetValue (key)—To lookup a value corresponding to a key from the data structure

```
Generate J Hash values for the given key
run parallelly for each hash value    // This is an optimization step and gives great results
{
    If (count == 0)
    {
        return "key does not exist"
    }
    If (count == 1 and decrypt sum(Key) == key and decrypt sum(hash(sum)) = hash(sum) )
    {
        decrypt key
        decrypt value
        return key, value pair
    }
} end for
pick any hash Value // this functionality can be enabled/disabled as per use
cases of this data structure
{
        search in the LE list and return the corresponding value if key is found }
```

Figure 3:
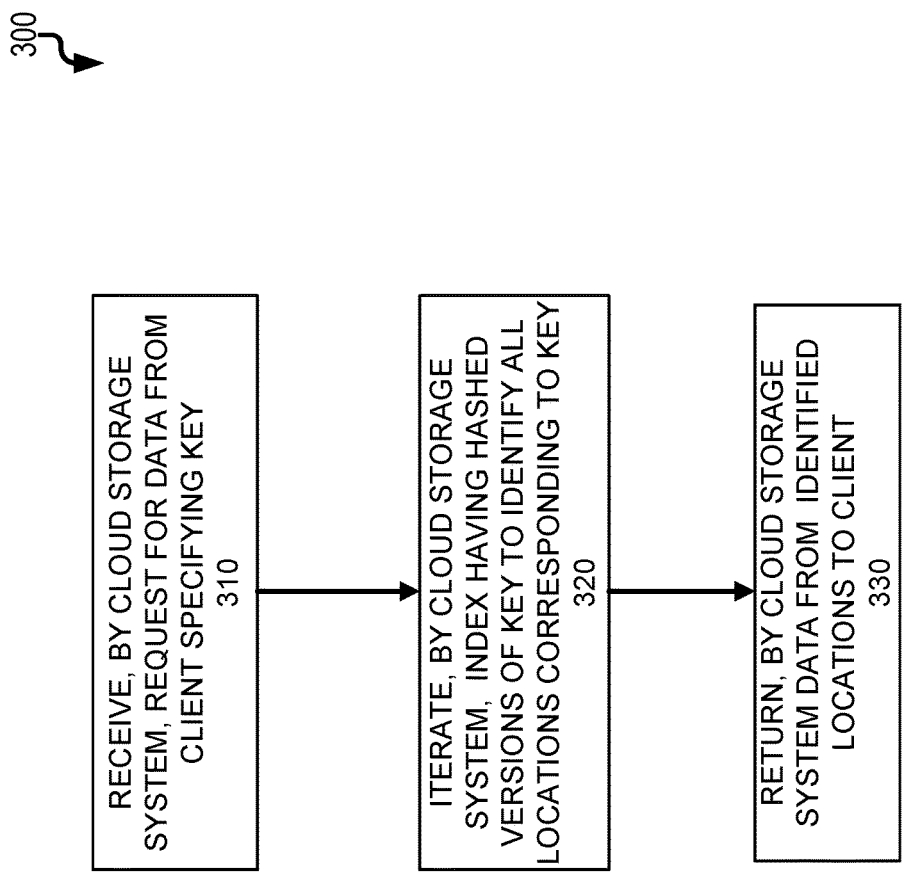
FIG. 3 is a process flow diagram illustrating secure retrieval of cloud-based sensitive data by obfuscating data access patterns.

FIG. 3 is a process flow diagram 300 in which, at 310, a cloud storage system receives a request for data from a remote client that specifies a key. Thereafter, at 320, the cloud storage system iterates through an index to identify all locations corresponding to the specified key. Such index is generated by applying a series of j hash functions to each key resulting in a j different tables forming part of the index. Using the index, the cloud storage system, at 330, returns data from the identified locations to the client.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 4:
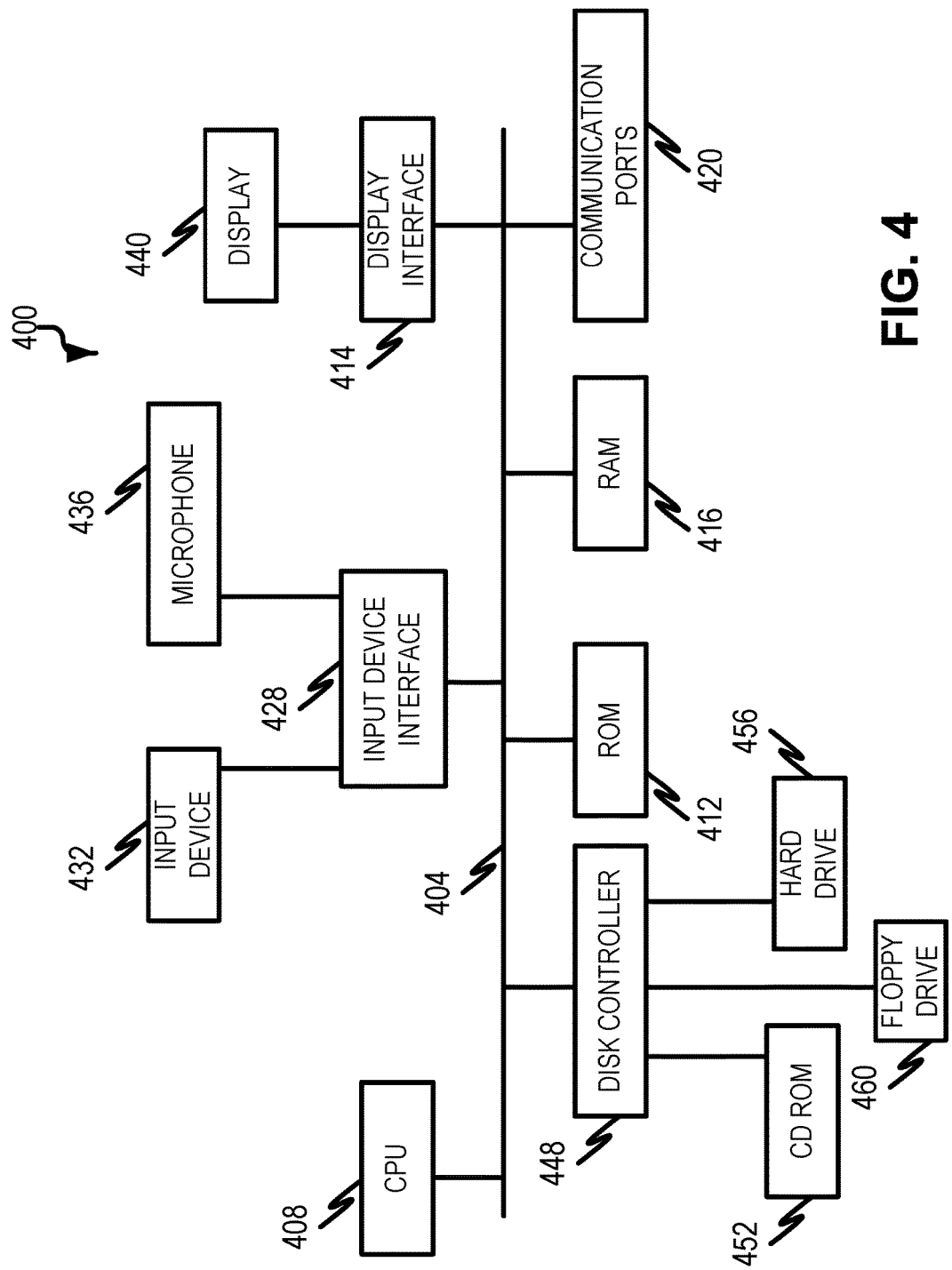
FIG. 4 is a diagram of a computing device for implementing aspects provided herein.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. In the input device 432 and the microphone 436 can be coupled to and convey information via the bus 404 by way of an input device interface 428. Other computing devices, such as dedicated servers, can omit one or more of the display 440 and display interface 424, the input device 432, the microphone 436, and input device interface 428.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for securely retrieving cloud-based data by obfuscating access patterns, the method comprising:
receiving, by a cloud storage system from a remote client, a request for data, the request including a key of a plurality of keys;
iterating, by the cloud storage system, an index to identify all data value locations corresponding to the key included in the request, the index being generated by applying a series of j hash functions to each key of the plurality of keys resulting in a j different tables forming part of the index; and
returning, by the cloud storage system to the client and based on the iterating, data from the identified value locations;
decrypting and re-encrypting any memory locations implicated by the request using at least one non-deterministic encryption algorithm which causes the stored data at such memory locations of the cloud system to change, the stored data being made indistinguishable as to when new data is written and when existing data is rewritten.

2. The method of claim 1, wherein each location within the index stores a count of keys mapping to such location.

3. The method of claim 2, wherein each location within the index further stores a sum field specifying a sum of the keys, the sum field being encrypted.

4. The method of claim 3, wherein each location within the index further comprises a sum of values corresponding to the keys, the sum of values being encrypted.

5. The method of claim 4, wherein each location within the index further comprises a sum field containing a sum of the corresponding hash of the key, the sum field being encrypted.

6. The method of claim 5, wherein each location within the index further comprises a sum of the value, the sum of the value being encrypted.

7. A system for securely retrieving cloud-based data by obfuscating access patterns, the system comprising:
at least one data processor; and
memory storing instructions which, when executed by at least one data processor, result in operations comprising:
receiving, by a cloud storage system from a remote client, a request for data, the request including a key of a plurality of keys;
iterating, by the cloud storage system, an index to identify all data value locations corresponding to the key included in the request, the index being generated by applying a series of j hash functions to each key of the plurality of keys resulting in a j different tables forming part of the index; and returning, by the cloud storage system to the client and based on the iterating, data from the identified value locations;

decrypting and re-encrypting any memory locations implicated by the request using at least one non-deterministic encryption algorithm which causes the stored data at such memory locations of the cloud system to change, the stored data being made indistinguishable as to when new data is written and when existing data is rewritten.

8. The system of claim 7, wherein each location within the index stores a count of keys mapping to such location.

9. The system of claim 8, wherein each location within the index further stores a sum field specifying a sum of the keys, the sum field being encrypted.

10. The system of claim 9, wherein each location within the index further comprises a sum of values corresponding to the keys, the sum of values being encrypted.

11. The system of claim 10, wherein each location within the index further comprises a sum field containing a sum of the corresponding hash of the key, the sum field being encrypted.

12. The system of claim 11, wherein each location within the index further comprises a sum of the value, the sum of the value being encrypted.

13. A non-transitory computer program product for securely retrieving cloud-based data by obfuscating access patterns, the computer program product storing instructions which, when executed by at least one data processor forming part of at least one computing device, result in operations comprising:

receiving, by a cloud storage system from a remote client, a request for data, the request including a key of a plurality of keys;

iterating, by the cloud storage system, an index to identify all data value locations corresponding to the key included in the request, the index being generated by applying a series of j hash functions to each key of the plurality of keys resulting in a j different tables forming part of the index; and returning, by the cloud storage system to the client and based on the iterating, data from the identified value locations;

decrypting and re-encrypting any memory locations implicated by the request using at least one non-deterministic encryption algorithm which causes the stored data at such memory locations of the cloud system to change, the stored data being made indistinguishable as to when new data is written and when existing data is rewritten.

14. The computer program product of claim 13, wherein each location within the index stores a count of keys mapping to such location.

15. The computer program product of claim 14, wherein each location within the index further stores a sum field specifying a sum of the keys, the sum field being encrypted.

16. The computer program product of claim 15, wherein each location within the index further comprises a sum of values corresponding to the keys, the sum of values being encrypted.

17. The computer program product of claim 16, wherein each location within the index further comprises a sum field containing a sum of the corresponding hash of the key, the sum field being encrypted; and wherein each location within the index further comprises a sum of the value, the sum of the value being encrypted.

\* \* \* \* \*